J. W. CRARY.

Hot Air Furnace.

No. 8,416. Reissued Sept. 17, 1878.

WITNESSES:

Gustave Dieterich

C. Sedgwick

INVENTOR:

J. W. Crary

BY Munn & Co.

ATTORNEYS.

N. PETERS, PHOTO-LITHOGRAPHER, WASHINGTON, D. C.

UNITED STATES PATENT OFFICE.

JOHN W. CRARY, OF PHILADELPHIA, PENNSYLVANIA.

IMPROVEMENT IN HOT-AIR FURNACES.

Specification forming part of Letters Patent No. 161,208, dated March 23, 1875; Reissue No. 8,416, dated September 17, 1878; application filed May 27, 1878.

*To all whom it may concern:*

Be it known that I, JOHN W. CRARY, of the city and county of Philadelphia, and State of Pennsylvania, have invented a new and useful Improvement in Hot-Air Furnaces, of which the following is a specification:

The objects of my invention are, first, to obtain from a heater a more wholesome heated air than is obtained by contact with metal surfaces; and, secondly, to so construct a heating-furnace that the products of combustion will be thoroughly distributed over the heating-chamber before passing to the outlet-flue; and these objects I attain in the manner which I will now proceed to describe, reference being had to the accompanying drawing, in which—

Figure 1:
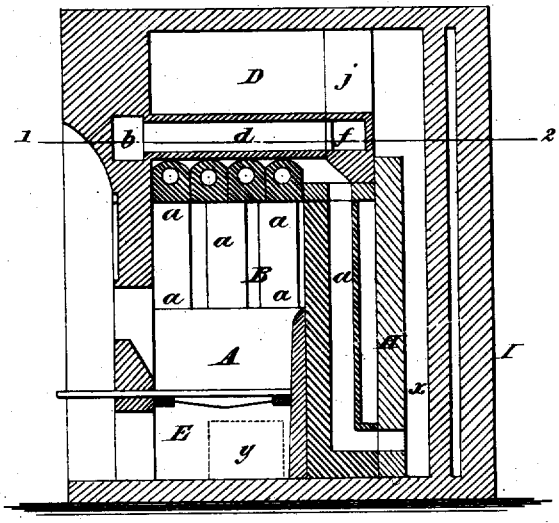
Figure 3:
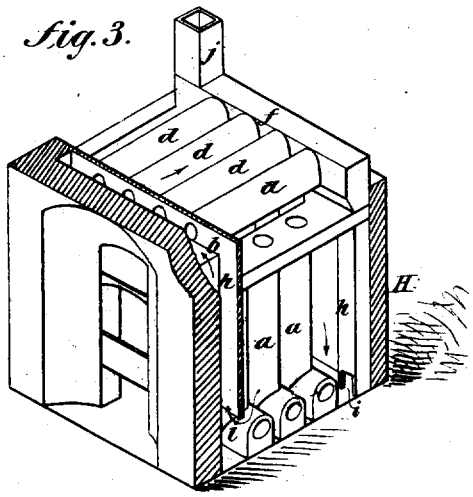
Figure 2:
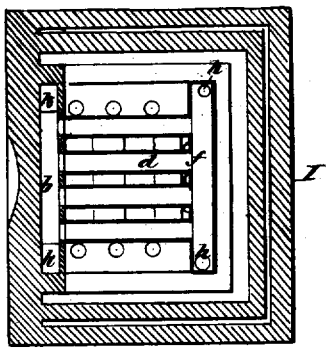

Figure 1 is a vertical section of my improved heating-furnace; Fig. 2, a sectional plan on the line 1 2, Fig. 1; and Fig. 3, a perspective diagram of the furnace.

Similar letters of reference indicate corresponding parts.

I have ascertained by experiment that by using unburned clay, or clay which has not been subjected to a fusing heat, instead of iron, burned clay, or any metallic substance, or crystallized or vitrified argillaceous substance, for heating-surfaces of furnaces, the warm air is of a much more wholesome and agreeable character than hot air obtained in any other way. It is a well-known fact that air passed through an iron furnace will be deoxidized and become vitiated. Several attempts have been made to remove the objectionable features of iron furnaces by constructing the hot-air passages of burned clay, brick, stone, or pottery-ware; but, while the air coming from such a heater is not deoxidized or impaired by coming in contact with a metal surface, still the use of the materials above mentioned does not produce the results which are obtained by the use of unburned or dried clay.

It is a well-known fact that raw or unburned clay is and can be used in a pulverized state for disinfecting purposes, as it is a good absorbent of noxious gases. Its use in the well-known earth-closets confirms this statement. I avail myself of the absorbent and disinfectant properties of raw or dried clay, and use it in the construction of flues, pipes, or air-passages of a hot-air furnace. In this manner I produce what may be termed "clay heat," or air heated by coming in contact with a clay surface which has not been subjected to a fusing heat, so as to lose its absorbent and disinfectant properties. The air passed through pipes or passages made according to my invention will remain moist and healthful, and is freed from all animal and vegetable poisons it may contain, the latter being absorbed and consumed by the hot clay.

The air from my heater does not become decomposed, nor lose its vital healthful qualities and natural moisture. The heat or hot air passing from furnaces of an ordinary construction is altogether too dry, and for this reason vaporizers must be used.

I dispense with all air-moistening devices, and use only the natural air in a purified or disinfected state.

The manner in which I prefer to arrange the pipes in a furnace is shown in the drawing, in which A represents the fire-place; B, the combustion-chamber, which is above and around the fire-place; D, the hot-air chamber, which surrounds the combustion-chamber; and E, the ash-pit.

In the combustion-chamber at each side of the fire-place, as well as at the back and top of the same, I arrange the air-heating pipes *a*, all of these pipes, with the exception of those forming the roof of the fire-place, communicating at the bottom with the air-chamber *x* between the inner wall, H, and outer wall, I, of the furnace. This chamber *x* communicates with the exterior air through an opening, *y*, in the outer wall of the furnace, and also communicates at the top with the hot-air chamber D, so that the chamber acts, in conjunction with the heating-pipes, in warming the air admitted through the aperture *y*.

The arrangement of the apertures for controlling the course of the products of combustion is an especial feature of my invention, and therefore demands more minute description.

In the front wall of the furnace, above the level of the top row of heating-pipes, I form a longitudinal gas passage or flue, *b*, which communicates through pipes *d* with a similar flue, *f*, at the back of the furnace. Both of these flues *b f* communicate at each end with gas-passages *h*, which extend to the bottom of the combustion-chamber, and are there provided with openings *i*, through which the products of combustion enter. The passage *f* has also at one end an outlet-flue, *j*, communicating with the chimney. By thus arranging the outlet-apertures, the products of combustion are caused to circulate freely throughout the entire interior of the combustion-chamber and in intimate contact with the heating-pipes *a* and partition-wall H.

Although I have described the heating-pipes *a* as being composed entirely of unburned or dried clay, it will be evident that they could be constructed of other material, provided with a lining of unburned or dried clay, without departing from my invention.

I am aware that mud or raw clay has been employed for lining the chimneys of dwellings; but such application of it is not suggestive of my invention, since the purposes or objects and the functions and effects are quite dissimilar.

Having thus described my invention, I claim as new and desire to secure by Letters Patent—

1. In a hot-air furnace, a hot-air pipe or flue having a continuous body of dried unburned clay, substantially as specified.

2. In a hot-air furnace, a hot-air pipe or flue having a shell or exterior portion of any suitable material and a lining of dried unburned clay, as specified.

3. In a heating-furnace, the combustion-chamber B and air-heating pipes *a* of clay, arranged at the sides, back, and top of said combustion-chamber, and combined with the surrounding air-space *x* and hot-air chamber D, all substantially as and for the purpose set forth.

4. The combination, in a heating-furnace, of a combustion-chamber, B, flues or passages communicating with the chimney, and openings *i*, forming communications between said flues and the combustion-chamber near the lower corners of the latter, as and for the purpose set forth.

5. The combination of the passages *b* and *f*, the connecting-pipes *d*, vertical flues *h*, having openings *i*, and exit-flue *j*, communicating with said passage *f*, all as and for the purpose set forth.

J. W. CRARY.

Witnesses:
J. FRANCIS D. MCGLENSEY,
JOHN P. MOORE.